Figure 1:
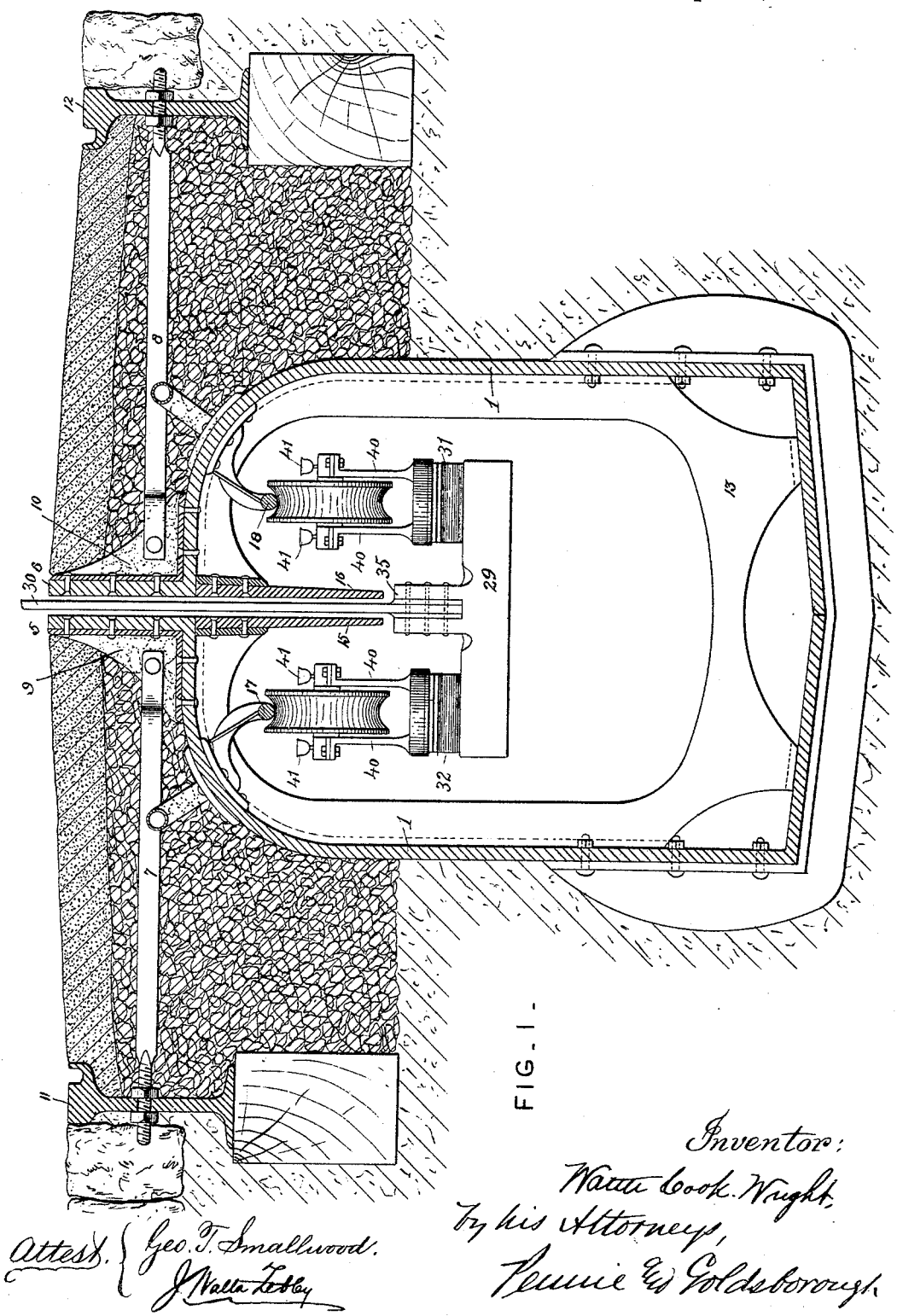

(No Model.) 4 Sheets—Sheet 3.

W. C. WRIGHT.
ELECTRIC RAILWAY.

No. 458,931. Patented Sept. 1, 1891.

Attest:
Geo. T. Smallwood.
J. Walter Lebley

Inventor:
Walter Cook Wright,
By his Attorneys,
Pennie & Goldsborough.

(No Model.) 4 Sheets—Sheet 4.

W. C. WRIGHT.
ELECTRIC RAILWAY.

No. 458,931. Patented Sept. 1, 1891.

Attest:
Geo. T. Smallwood.
J. Walter Sebley

Inventor:
Walter Cook Wright
by his Attorneys,
Pennie & Goldsborough

UNITED STATES PATENT OFFICE.

WALTER COOK WRIGHT, OF PHILADELPHIA, PENNSYLVANIA.

ELECTRIC RAILWAY.

SPECIFICATION forming part of Letters Patent No. 458,931, dated September 1, 1891.

Application filed November 25, 1889. Serial No. 331,475. (No model.)

*To all whom it may concern:*

Be it known that I, WALTER COOK WRIGHT, a citizen of the United States, residing at Philadelphia, in the county of Philadelphia and State of Pennsylvania, have invented certain new and useful Improvements in Electric Railways; and I do hereby declare the following to be a full, clear, and exact description of the invention, such as will enable others skilled in the art to which it appertains to make and use the same.

My invention relates to certain new and useful improvements in electric railways, and more particularly, first, to the construction of the conduit within which the electric conductors are located, and, secondly, to the contact-carriage supplying current to the car-motor.

My improvements in the construction of the conduit contemplate provisions for protecting the electric conductors and the contact-rollers receiving current therefrom from access of drippings through the slot of the conduit by locating the conductors and rollers upon such a plane with respect to the lower edges of two depending aprons at opposite sides of said slot that any water entering the latter shall be directed downward below the line of possible contact with said conductors and rollers.

My improvements also include a construction and arrangement of parts whereby the conduit may be supplied in sections containing corresponding sections of the electric conductors fixed accurately and rigidly in their proper locations therein, thereby insuring perfect workmanship throughout the conductor when laid, the joints between the conductor-sections being made by the line-workmen outside the conduit and after the latter is laid and joined within the trench and substantially filled in and rammed, thereby overcoming liability to rupture of the connections during said operations of jointing, filling in, and ramming. Incident to this part of my invention is the provision of a flexible water-proof joint for the external ends of the conductor-sections, said joint being adapted to be readily uncoupled for the removal of a conduit-section, and of bridge-pieces of insulating material at the conduit-joints, said bridge-pieces being in alignment with the conductor-line within the conduit and of the same diameter as the conductors themselves, so as to span the space between the adjacent ends of the successive conductor-sections and complete the continuous trackway for the contact-rollers. It will be understood, of course, that the said bridge-pieces will be shorter than the distance between the front and rear contact-rollers, so that continuity of current-supply to the motor may remain unbroken. The bridge-pieces furnish an additional safeguard against the access of moisture to the conductors, inasmuch as any water entering a defective conduit-joint would as it dropped to the bottom of the conduit strike the trackway at its insulated portion only.

The conduit as a whole is provided with projecting wings, insuring its secure and firm anchorage in the soil, and with internal ribs and braces, enabling it to successfully resist external loads, strains, and jars from the road-bed.

My improvements in the contact-roller carriage consist in a construction insuring the appropriate yielding pressure desirable for the best contact with the conductors, and also the flexibility of movement which will permit the rollers to instantly adapt themselves to the conductors where the latter depart from a right line—as, for instance, in passing curves or where the conductor has accidental bends or kinks. For this purpose the front and rear rollers are swiveled upon the opposite elevated ends of a bowed leaf-spring, which is itself centrally swiveled or pivoted to the frame of the carriage. Flexible springs normally hold the axes of the swiveled rollers at right angles to the leaf-spring upon which they are mounted, and another spring tends to keep the said leaf-spring in line with the general direction of travel. As has been said, the manner of mounting the rollers and their supports permits their deviation from the normal position, so as to closely follow all changes in the conductor-trackways, and the springs tend constantly to solicit them back to their original positions, which they reassume as soon as the irregularity in the trackway is passed.

The preferred form of my invention, embodying the improvements referred to, is illustrated in the accompanying drawings, wherein—

Figure 2:
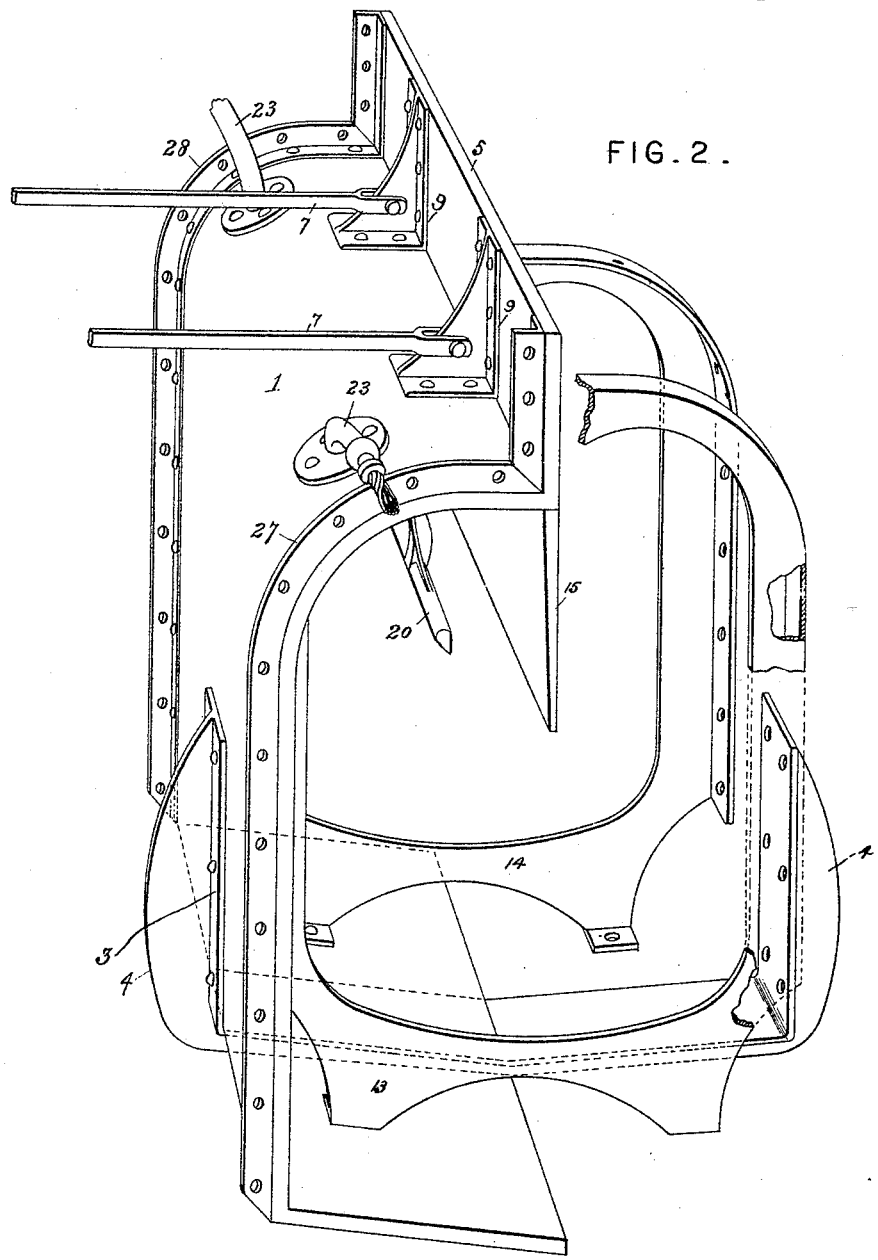
Figure 3:
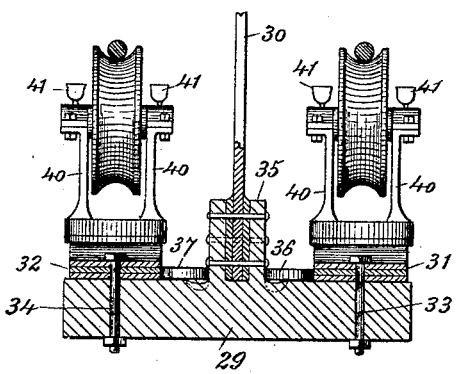
Figure 4:
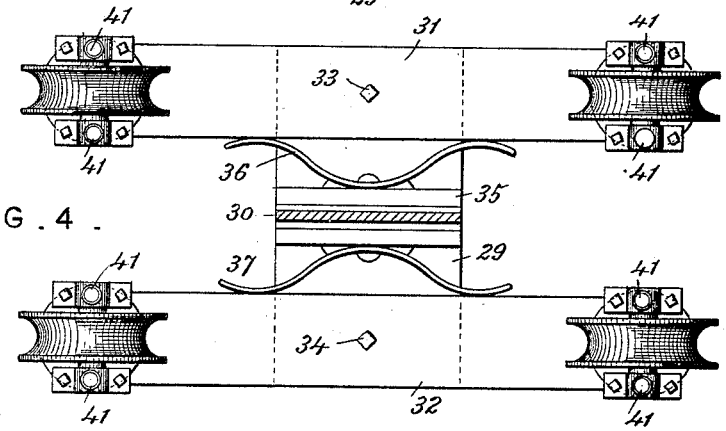
Figure 5:
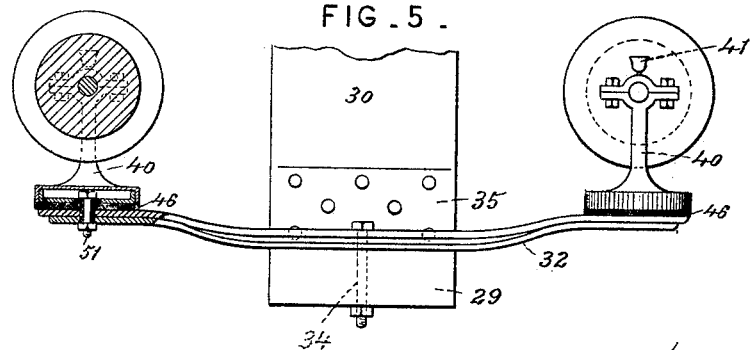
Figure 6:
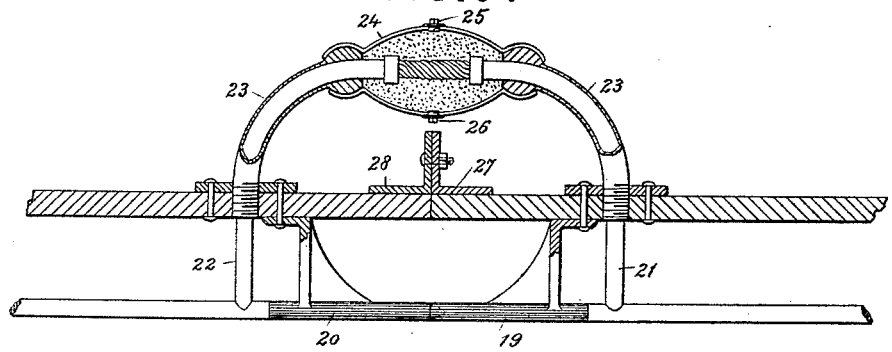
Figure 7:
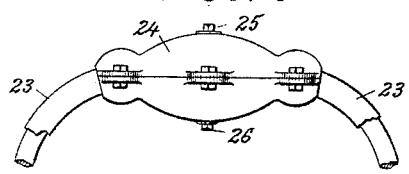
Figure 8:
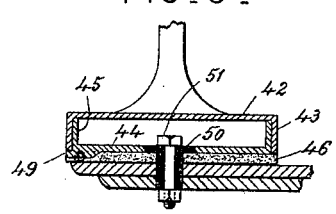
Figure 9:
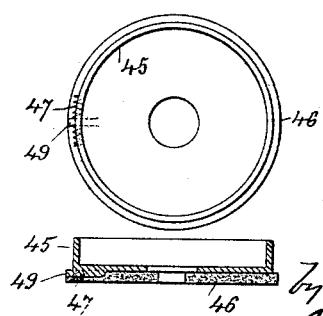

Figure 1 represents in transverse section an electric railway having a conduit constructed in accordance with my invention and in end elevation the contact-roller carriage. Fig. 2 represents in perspective the conduit, certain portions being broken away to more clearly illustrate the remaining parts. Fig. 3 represents in vertical cross-section the contact-roller carriage. Fig. 4 represents a plan view, and Fig. 5 represents a side view thereof partly in section. Fig. 6 represents in side elevation and partial section the conductor-joint and conduit-section joint. Fig. 7 represents in side elevation the conductor-joint. Fig. 8 represents in enlarged detail a sectional view of the swivel-joint for the contact-rollers, and Fig. 9 represents minor details of said joint.

Similar numerals of reference indicate similar parts throughout the several views.

Referring to the drawings, it will be noted that the main body of the conduit is made up of sections consisting each of two hollow homologous shells 1 2, adapted to form when placed together an inclosed chamber. The abutting lower edges of said shells are preferably ground off to make a tight joint, and the bottom portions of the shells are inclined toward the center, as shown, so as to form a collecting-gutter for carrying off to the manhole drains any water that may penetrate through the conduit-slot or conduit-joints or any moisture that may condense upon the interior of the conduit-walls. The shells are rigidly connected at their lower parts by the strap or seat 3, which may conveniently be located at the center of each section and within which the two shells fit and to which they are connected by nuts and bolts, as shown.

The strap or seat 3 is provided with a projecting rib 4 for the purpose of securely anchoring it in the soil, and the general cross-section of the conduit widens from the top toward the bottom, so as to resist upheaval by frost or the like.

At their upper portions the shells are provided with the upwardly-projecting longitudinal flanges 5 6, separated from each other a sufficient distance to form the conduit-slot and braced against closing by the brace-bars 7 8, connected at their inner ends to the webs of angle-pieces 9 10, riveted to the conduit, and at their outer screw-threaded ends secured by nuts to the track-rails 11 12.

Within the conduit are located the supporting or bracing partitions 13 14, having flanges bolted or riveted to the bottom and sides of the shells and having cut-away portions, as shown, to lighten them and to provide for the passage of water beneath them. These partitions add materially to the strength of the conduit, enabling it the better to resist external loads or shocks from the roadway. At their upper inner ends the partitions are riveted to two longitudinal aprons 15 16, the intervals between said aprons constituting a continuation of the conduit-slot, as shown. These aprons extend downwardly into the conduit and for a sufficient distance to direct any water that may enter the conduit-slot below the electric conductors and contact-rollers and to the bottom of the conduit. To this end the conductors 17 18 are located at the top of the conduit on opposite sides of said aprons and entirely above their lower edges, so that the drippings through the conduit-slot cannot possibly strike said conductors. The conductors are supported from the walls of the conduit-sections by means of insulating bracket-arms, as shown. In practice the work of placing and securing the said bracket-arms in position is done at the work-shops of the constructing-company, thereby insuring perfect alignment and spacing of the conductors before delivery, instead of relying upon the line-wrokmen.

It will be noted on reference to Fig. 6 that the sections of the conductor do not extend entirely to the end of the conduit-section, but are continued to the end of said section by bridge-pieces, as 19 20, supported by brackets, as shown, from the conduit. These bridge-pieces are of the same diameter as the conductors themselves, but are of insulating material. They span or bridge the space between the adjacent ends of contiguous sections of the conductors and furnish a continuation or completion of the trackway along which the contact-rollers travel. They are preferably connected by a socket-joint, as illustrated in dotted lines in Fig. 6. The conductors themselves are connected at their adjacent sections by branches, as 21 22, sweated to the ends of the conductor-sections and passing upwardly and outwardly through a curved pipe 23, connected to the exterior of the conduit-walls in any suitable manner. This construction enables the conductor-sections to be joined together after the conduit is laid in the trench and the filling-in material has been well rammed and tamped at the sides of the conduit, so that danger of breaking the electrical connection by subsidence of any part of the conduit need not be feared. The ability to make the electrical connection outside of the conduit also renders it more convenient both to make and to uncouple said connection.

The free ends of the branches 21 22 are connected electrically by a suitable coupling-box of any well-known construction, the interior space of said coupling-box being preferably filled with melted paraffine or similar insulating and water-proof material capable of being rendered liquid by the application of heat. After the joint is made the said liquid insulating material may be poured into the hollow coupling-sleeve 24 through an opening 25 therein, whereupon it is permitted to solidify, so as to exclude moisture from the soil to the joint. When the joint is to be uncoupled, the insulating filling material may be rendered liquid by the application of heat and may be allowed to flow out through a bottom opening normally closed by the plug 26. It will of course be understood that the combined length of the insulating bridge-pieces 19 20 must be less than the distance between the front and rear contact-rollers of the carriage, so that in passing from one of the conductor-sections to the next succeeding conductor-section one at least of said contact-rollers shall always be in electrical connection with the conductor, so that continuity of current-supply to the car-motor may not be interrupted.

The ends of the conduit-sections are provided with flanges 27 28, riveted thereto, said flanges being adapted to be connected or disconnected by means of nuts and bolts, as shown.

The contact-roller carriage consists, primarily, of a stout cross-piece 29, supported from the car in the usual manner by a depending plate 30, passing through the conduit-slot and between the aprons. At opposite ends of the cross-piece 29 are mounted leaf-springs 31 32, swiveled at their centers upon pivot-pins 33 34, as shown. Between the edges of the springs 31 32 and the proximate sides of a central projection 35 upon the carriage-frame are interposed the springs 36 37, fixed at their centers to said raised projection and bearing at their free ends upon the edges of the springs 31 32 and at equal distances on opposite sides of the central pivotal points of said springs 31 32, so as to normally maintain said latter springs in line with the general direction of the conduit or at right angles to the cross-piece 29, as shown in Figs. 1, 3, and 4. Upon the opposite elevated ends of the leaf-springs 31 32 are mounted the front and rear contact-rollers. These rollers are mounted in bearings formed upon the standards 40, said bearings being provided with the usual oil-cups 41 and being mounted upon a base capable of a limited revolution in either direction.

The details of the connection between the said base and the end of the leaf-spring are illustrated more clearly in Figs. 8 and 9 of the drawings. In said figures the base consists of a portion 42, having an annular flange 43 fitting down over a piece 44, having a similar upturned flange 45. The piece 44 rests upon a disk 46, of insulating material, and within suitable recesses in said disk are located the coil-springs 47 48 on opposite sides of a projection 49, extending downwardly into said recess and between the springs. A flanged ferrule 50, of insulating material, serves for the reception of the shank of the bolt 51, upon which the contact-roller is swiveled. It will be evident that with the construction described the contact-rollers will normally be held in the positions indicated in Figs. 1, 3, 4, and 5, but that they may swing or revolve upon their bases to the right or left within the limits permitted by the recess and springs described, so as to follow any slight bends or kinks in the conductors. In rounding curves the contact-roller carriage will accommodate itself very accurately to the change in direction and curvature of the track. The springs 36 37 will yield sufficiently to enable the rollers to retain their places upon the track, and the rollers themselves will turn upon their pivotal points sufficiently to maintain their grooves in constant alignment with the conductors, while the upward pressure of the leaf-spring 31 32 will preserve a good rubbing-contact and keep the lower surface of the conductors and the face of the groove in the rollers bright and free from oxide.

Having thus described my invention, what I claim is—

1. In an electric-railway conduit, the combination, with the successive conducting trackway-sections separated from each other at the conduit-joints, of trackway-sections of insulating material bridging the space between the said conducting-sections, substantially as described.

2. In an electric-railway conduit, the combination, with the successive conducting trackway-sections separated from each other at the conduit-joints, of trackway-sections of insulating material bridging the space between the said conducting-sections, and electrical connections for the latter outside the conduit-walls, substantially as described.

3. In an electric-railway conduit, the combination, with the successive conducting trackway-sections separated from each other at the conduit-joints, of trackway-sections of insulating material bridging the space between the said conducting-sections, electrical connections for the latter extending outside the conduit-walls, said electrical connections comprising separable couplings also outside the conduit-walls, substantially as described.

4. In an electric-railway conduit, the combination, with the conducting trackway-sections 20, of the branch connections 22, extending through the conduit-walls, the insulating-sleeves 23, and the two-part coupling-box 24, provided with an inlet and an outlet for liquefiable insulating material, substantially as described.

5. In an electric railway, a contact-roller carriage having swiveled contact-rollers mounted at the front and rear ends of a swiveled connecting-support, substantially as described.

6. In an electric railway, a contact-roller carriage having swiveled contact-rollers, and a swiveled resilient support upon which said rollers are mounted, substantially as described.

7. In an electric railway, a contact-roller carriage having swiveled contact-rollers, a swiveled resilient support upon which said rollers are mounted, and a spring for maintaining said support normally in line with the trackway-conductor, substantially as described.

8. In an electric railway, a contact-roller carriage having swiveled contact-rollers and springs normally holding the axes of said rollers at right angles to the general direction of the conducting-trackway, substantially as described.

9. In an electric railway, a contact-roller carriage consisting of a hanger for suspension from the car, a cross-piece at the lower end of said hanger, bow-springs swiveled at the outer ends of the cross-piece, swiveled contact-rollers at opposite ends of the bow-springs, and bow-springs bearing against the edges of the latter, substantially as described.

10. In an electric railway, a contact-roller carriage having swiveled contact-rollers, the swivel-joint consisting of a base 44, insulated from its sustaining support and having a projection 49 at its edge, a stud 50, an insulating-sleeve 51, upon which said base may turn, an insulating-washer 46 between the base 44 and its support, said washer having a recess for the reception of the projection 49, and a spring located in said recess, substantially as described.

In testimony whereof I affix my signature in presence of two witnesses.

WALTER COOK WRIGHT.

Witnesses:
J. WALTER ZEBLEY,
JOHN C. PENNIE.